United States Patent [19]

Guirriec

[11] 4,259,874

[45] Apr. 7, 1981

[54] TRANSMISSION MECHANISM HAVING A VARIABLE TRANSMISSION RATIO

[75] Inventor: Louis Guirriec, Cormeilles en Parisis, France

[73] Assignee: Fonderie de L'Yonne, Sens, France; one half interest

[21] Appl. No.: 2,905

[22] Filed: Jan. 12, 1979

[30] Foreign Application Priority Data

Jan. 12, 1978 [FR] France .................. 78 00782

[51] Int. Cl.³ ................ F16H 55/52; F16G 51/80
[52] U.S. Cl. .............................. 474/28; 474/8; 474/56; 474/46; 474/245
[58] Field of Search .......... 74/230.17 F, 230.17 S, 74/230.17 A, 237, 232, 233, 234, 235, 236, 231 C, 231 J

[56] References Cited

U.S. PATENT DOCUMENTS

| | | | |
|---|---|---|---|
| 803,811 | 11/1905 | Cutter | 74/230.17 S |
| 2,728,239 | 12/1955 | Adams, Jr. | 74/233 X |
| 3,115,049 | 12/1963 | Moan | 74/230.17 F |
| 3,118,311 | 1/1964 | Francis | 74/230.17 F |
| 3,177,734 | 4/1965 | Rackelboom | 74/230.17 F |
| 3,396,591 | 8/1968 | Schorp | 74/230.17 S |
| 3,448,630 | 6/1969 | Keller | 74/236 |
| 3,782,213 | 1/1974 | Rattunde | 74/230.17 F |
| 4,048,863 | 9/1977 | Pemberton | 74/236 |
| 4,048,864 | 9/1977 | Ritter | 74/230.17 F |

FOREIGN PATENT DOCUMENTS

| | | | |
|---|---|---|---|
| 117720 | 11/1943 | Australia | 74/236 |
| 597184 | 5/1934 | Fed. Rep. of Germany | 74/230.17 S |
| 1005792 | 4/1957 | Fed. Rep. of Germany | 74/235 |
| 2116930 | 11/1971 | Fed. Rep. of Germany | 74/231 C |
| 2505228 | 12/1976 | Fed. Rep. of Germany | 74/231 C |
| 495139 | 6/1954 | Italy | 74/236 |
| 193712 | 10/1937 | Switzerland | 74/230.17 S |
| 301903 | 9/1954 | Switzerland | 74/230.17 S |
| 840772 | 7/1960 | United Kingdom | 74/230.17 S |
| 919476 | 2/1963 | United Kingdom | 74/233 |

OTHER PUBLICATIONS

"System RH", PIV publication.

*Primary Examiner*—Leslie Braun
*Attorney, Agent, or Firm*—Sughrue, Rothwell, Mion, Zinn and Macpeak

[57] ABSTRACT

The mechanism comprises at least one driving shaft and at least one driven shaft. A first pulley is keyed to rotate with the driving shaft and has a cheek which is fixed in translation and a cheek which is movable in translation relative to the first cheek. A second pulley is keyed to rotate with the driven shaft and has a cheek which is fixed in translation and a cheek which is movable in translation relative to the fixed cheek. A device is provided for controlling the displacement of the movable cheek of the first pulley. A transmission device extends around the first pulley and the second pulley. Radial elements adapted to be engaged in corresponding recesses in the transmission device are keyed to rotate with the driving shaft and the driven shaft between the cheeks of the first pulley and second pulley. The recesses are defined by portions of the transmission device which have a transverse elasticity so as to ensure the gripping of the radial elements when a force is exerted for moving the cheeks of the first and second pulleys toward each other.

23 Claims, 11 Drawing Figures

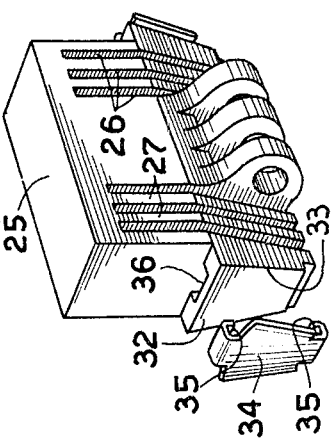
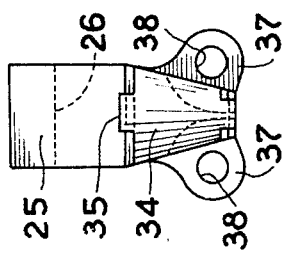
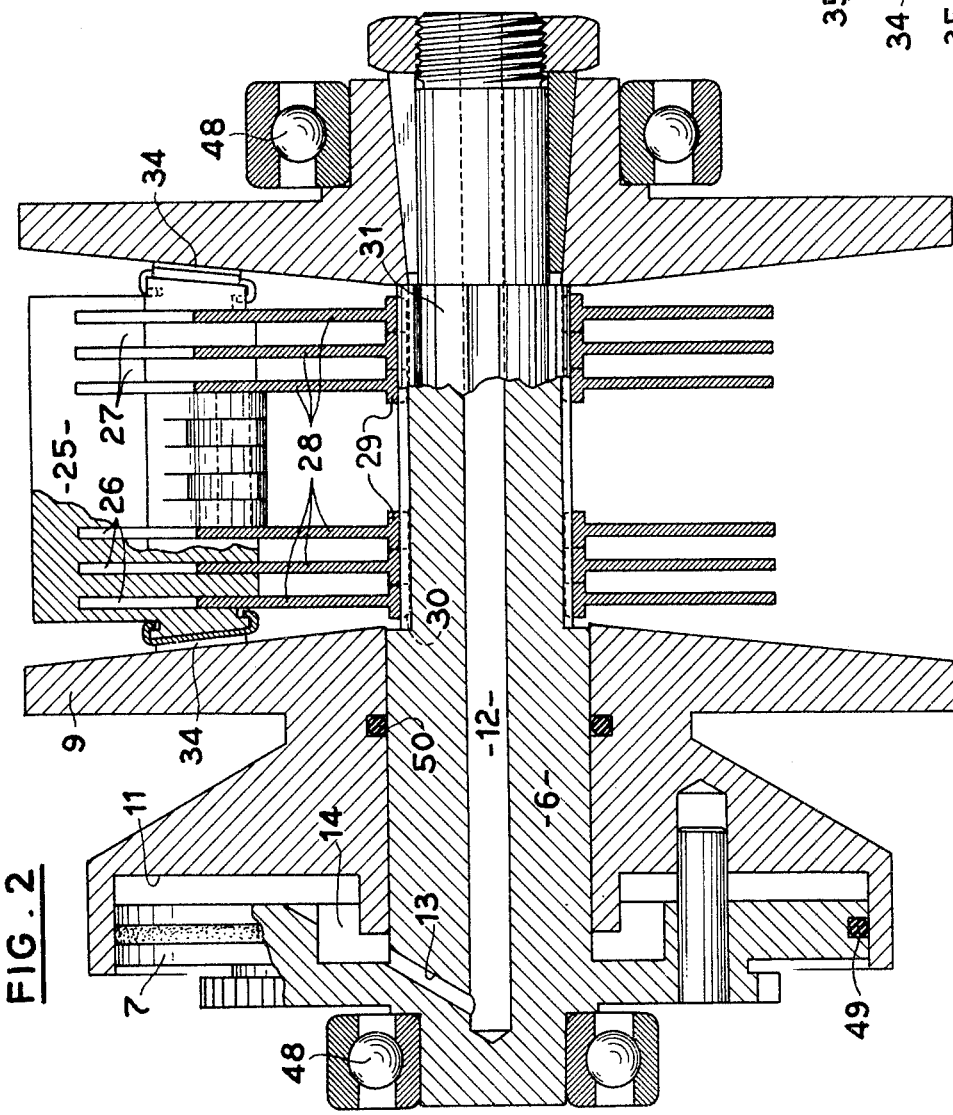

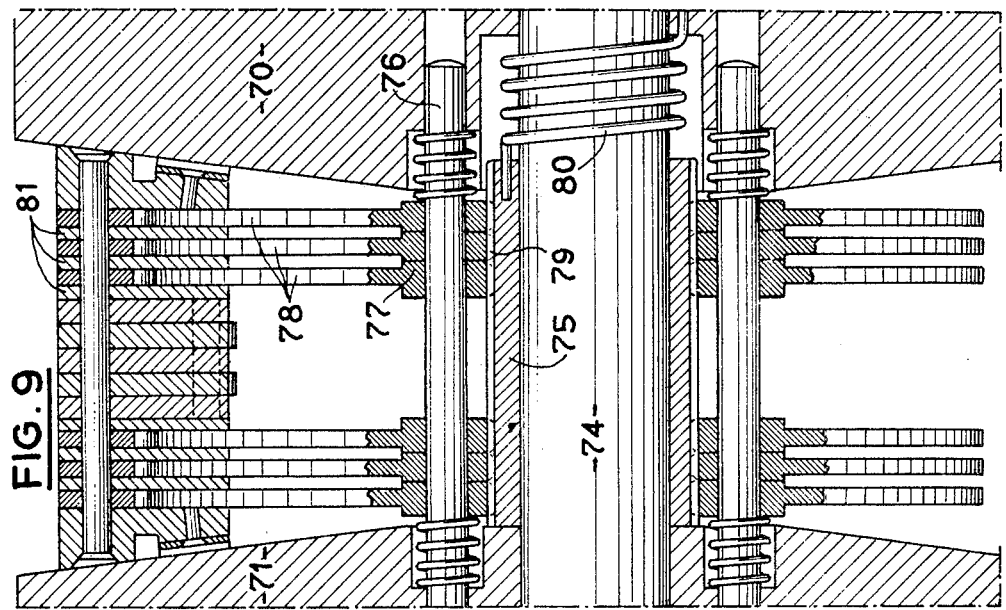
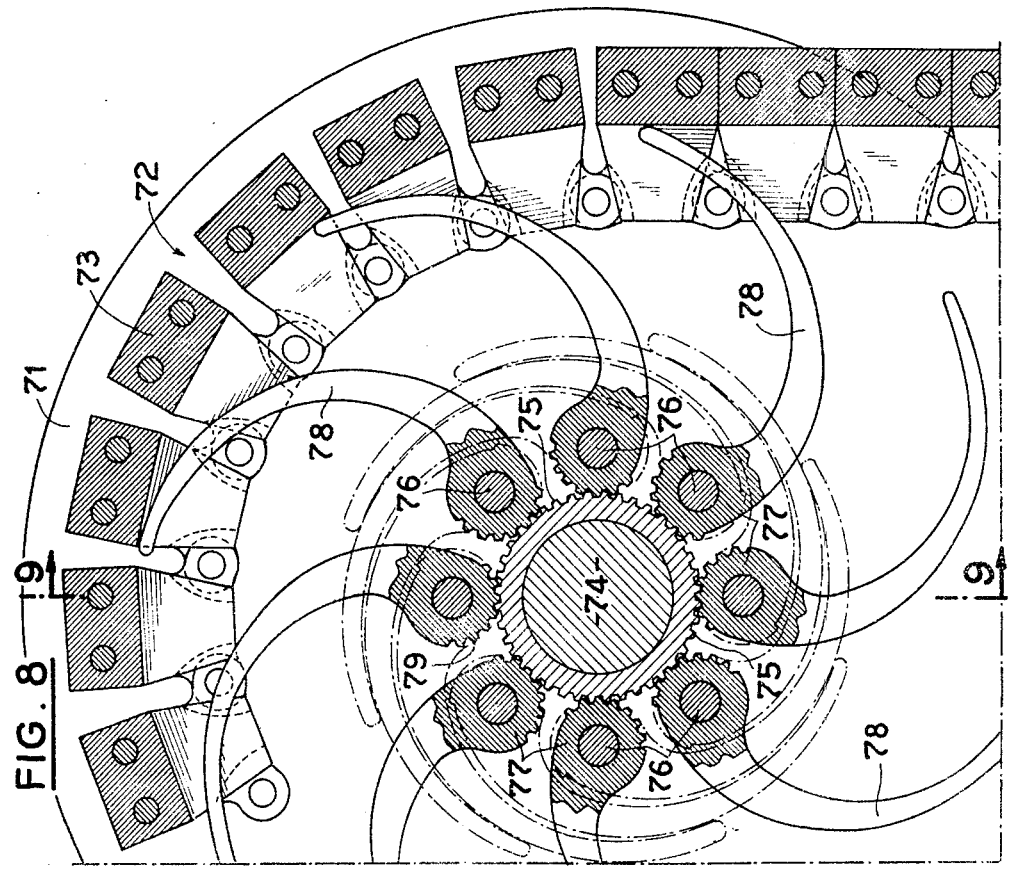

TRANSMISSION MECHANISM HAVING A VARIABLE TRANSMISSION RATIO

The present invention relates to a transmission mechanism having a transmission ratio which is variable in a continuous manner and designated by the term "variator".

It is known that the use on automobile vehicles and also in the machine tool field of a transmission whose ratio varies in a continuous manner is most advantageous.

Indeed, the value of this ratio can be adapted at each instant to the conditions of operation of the motor driving the vehicle or the machine in accordance with the required torque and speed.

A large number of transmission mechanisms are known which are of the aforementioned type and attempt to satisfy the foregoing conditions.

Known variators of a first important type comprise conical convex discs which are connected to rotate with a first shaft, these discs being gripped between other discs or rings having lateral faces which are also convex and connected to rotate with a second shaft parallel to the first shaft.

In these variators, the speed is varied by modifying the distance between the two shafts.

Such variators have the following drawbacks:
the range of variation of the transmission ratio is very limited and requires the association with the variators of an expensive torque convertor which reduces the overall efficiency;
the fact that the distance between the driving shaft and the driven shaft is variable renders the kinematics of the variator complex;
the fact that the device actuating the moving shaft must overcome the gripping force exerted by the discs or rings carried by the other shaft results in an absorption of an appreciable part of the power and requires the use of a relatively large electric control motor. A second type of variator is also known having a driving pulley and driven pulley of variable diameter interconnected by a belt; however, the power transmitted by the variator is limited;
the life of the belt is too short; in order to overcome the drawbacks of variators of this second type there has been designed a variator in which the transmission belt is replaced by a chain.

However, such a substitution of the connecting means between the driving and driven pulleys by means which are more resistent to wear has not enabled the other drawbacks of variators having pulleys to be overcome, namely, an excessively low transmitted power for an excessively large overall size.

In order to increase the power transmitted, there has been proposed a variator comprising two connecting chains disposed in side-by-side relation between the driving pulley and the driven pulley, a disc keyed to the shaft of the driving pulley and a disc keyed to the shaft of the driven pulley being interposed between these chains.

With this arrangement, the number of zones of contact between the two chains, the cheeks of the pulleys and the disc is double the number of zones of contact between the single chain and the cheeks of the pulleys of a conventional variator, so that the transmitted power can be increased correspondingly. However, these variators also have drawbacks.

The magnitude of the force to be applied to the cheeks of the pulleys in order to ensure the transmission of the torque requires a system of ramps with which a hydraulic actuating unit is associated.

Such an arrangement renders the variator expensive.

The two independent chains operating in parallel undergo unequal elongations in the course of time and this results in a slip of one chain relative to the other, upon wear.

Further, when high powers are to be transmitted, the overall size of a variator of the aforementioned type is much too large to enable its use to be envisaged on an automobile vehicle.

An object of the invention is to overcome the aforementioned drawbacks by providing a variator which permits the transmission of high power and yet is of relatively simple construction and of small overall size.

According to the invention, there is provided a transmission mechanism having a transmission ratio which is variable in a continuous manner, comprising at least one driving shaft and at least one driven shaft, a first pulley keyed to rotate with the driving shaft and having a cheek which is fixed in translation and a cheek which is movable in translation relative to the fixed cheek, a second pulley keyed to rotate with the driven shaft and having a cheek fixed in translation and a cheek which is movable in translation relative to the fixed cheek, means for controlling the displacement of the movable cheek of the first pulley and transmission means extending around the first pulley and second pulley, wherein there are keyed to rotate with the driving shaft and driven shaft between the cheeks of the first pulley and second pulley radial elements adapted to be engaged in corresponding recesses in the transmission means, said recesses being defined by portions of said transmission means having a transverse elasticity so as to ensure the gripping of said radial elements upon the application of a force for moving the cheeks of said first and second pulleys toward each other.

According to a particular feature of the invention, said transmission means is a chain and each link of the latter has recesses which are parallel to the direction of displacement of the chain and defined by elastic plates which constitutes said portions of the transmission means which have a transverse elasticity.

Further features and advantages of the invention will be apparent from the ensuing description with reference to the accompanying drawings which are given merely by way of example and in which:

FIG. 2 is a sectional view, to an enlarged scale, of the driving pulley of one of the variators shown in FIG. 1;

FIG. 3 is a side elevational view of a link of the transmission chain of the variator according to the invention;

FIG. 4 is a perspective view of a link, such as that shown in FIG. 3, constructed in one piece;

FIG. 8 is a sectional and side elevational view of another embodiment of a variator according to the invention;

FIG. 9 is a sectional view taken on line 9—9 of FIG. 8;

An improved transmission mechanism according to the invention will be described with reference first to FIGS. 1 and 2.

Figure 1:
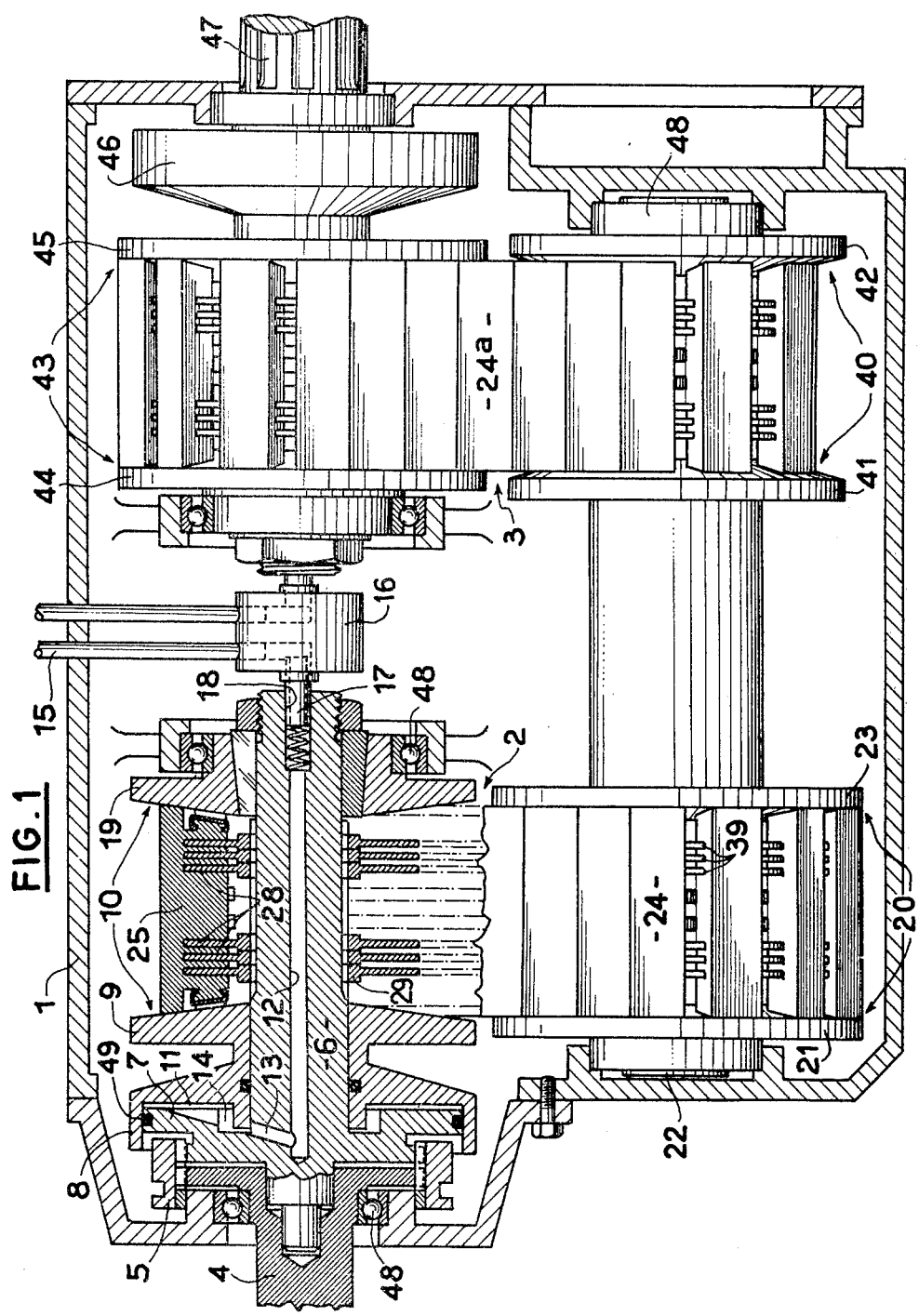
FIG. 1 is an elevational and sectional view of a variable-ratio transmission mechanism according to the invention comprising two variators coupled together.

FIG. 1 shows the transmission mechanism disposed in a housing 1 and comprising two speed variators 2 and 3.

The transmission mechanism comprises a driving shaft 4 and a driven shaft 47. The driving shaft 4 is connected by a conventional coupling device 5 to the input shaft 6 of the first variator 2. The input shaft 6 comprises, at the end thereof coupled to the driving shaft 4, a piston 7 which is part of a hydraulic jack 8 which controls the displacement of a cheek 9 of a first pulley of the variator 2 which is mounted to be axially movable on the input shaft 6.

The jack 8 further comprises a cylinder 11 which is in one piece with the pulley cheek 9 and therefore constitutes the moving part of the jack.

The jack 8 is supplied with fluid by way of an axial passageway 12 in the input shaft 6.

The passageway 12 is connected to the jack by a conduit 13 which communicates with a chamber 14 formed in the side of the piston 7 which faces the cylinder 11.

At its opposite end, the passageway 12 is connected to a supply pipe 15 through a pipe coupling 16 having a pipe portion 17 inserted in an orifice at the end of the passageway 12.

Keyed to the end of the input shaft 6 opposed to the cheek 9 is a cheek 19 which is fixed in rotation.

The cheeks 9 and 19 of the first pulley 10 have, in the known manner, frustoconical inner surfaces which face each other and are adapted to cooperate with connecting means which will be described hereinafter.

The variator 2 further comprises a second pulley 20 having a cheek 21 which is fixed in translation and keyed to the output shaft 22 of the variator and a cheek 23 which is mounted to be movable in translation on said output shaft. The cheeks 21 and 23 have, in the same way as the cheeks 9 and 19, inner frustoconical surfaces.

In the embodiment shown in FIG. 1, the connecting means between the pulleys 10 and 20 of the variator 2 comprise a chain 24. The links of the chain 24 cooperate successively with the frustoconical surfaces of the pulleys 10 and 20. Several embodiments of these links are shown in FIGS. 2 to 5.

As can be seen in particular in FIGS. 1 and 2, each link 25 has in section the shape of a comb having recesses 26 and plates 27, discs 28 keyed to rotate with the shaft 6 being engaged in the recesses 26.

In the embodiment shown in FIGS. 1 and 2, the discs 28 are carried by separate hubs 29 provided with inner grooves 30 engaged in splines 31 formed in the outer surface of the shaft 6.

The thickness of the plates of the links 25 is small enough to impart thereto a transverse elasticity enabling them to grip the discs 28 when an axial force is applied by the jack 8 to the cheek 9 of the pulley 10. They may be backed off.

The links 25 present contact means contacting the frustoconical surfaces of the cheeks 9 and 19 which are formed, as can be seen better in FIG. 4, by a projection 32 which is in one piece with each outer plate 27 of the link.

This projection has an inclined surface 33 whose inclination corresponds to the slope of the frustoconical surfaces of the cheeks. A curved elastically yieldable means 34 which is convex in the direction of the surface of the corresponding cheek is mounted on this frustoconical surface and adapted to ensure that the gripping of the discs 28 by the plates 27 of the links 25 only occurs when the link reaches a radial position relative to the frustoconical surfaces of the cheeks. The discs 28 may be slightly biconvex.

The elastically yieldable means 34 have hook portions 35 which are engaged in recesses 36 in the projections 32.

As can be seen in FIGS. 3 and 4, the links 25 have tabs 37 provided with orifices 38 in which the pins pivotally interconnecting the links are adapted to be engaged.

The pulley 20 of the variator comprises, in the same way as the pulley 10, discs 39 keyed to the output shaft 22 and cooperating with the chain 24.

The variator 3 of the transmission mechanism shown in FIG. 1 is identical to the variator 2 except for the fact that the positions of the pulley cheeks which are fixed and movable in translation are reversed.

Consequently, the input pulley 40 of the variator 3 has a cheek 41 which is axially movable and connected to move in translation with the cheek 23 of the pulley 20 of the variator 2.

On the other hand, the cheek 42 of the pulley 40 is fixed in translation.

Likewise, the output pulley 43 of the variator 3 has a cheek 44 which is fixed in translation and a cheek 45 movable in translation, the movements of the latter being controlled by a jack 46 similar to the jack 8 controlling the cheek 19 of the variator 2.

The pulleys 40 and 43 are interconnected by a chain 24a which is identical to the chain 24 of the variator 2.

The output shaft of the variator 3 is coupled to the driven shaft 47 of the transmission mechanism.

It will be understood that the shafts of the pulleys 10, 20, 40, 43 are mounted in the housing 1 by means of suitable rolling bearings 48 or any other suitable bearing means. The sealing of the piston 7 of the jack 8 is achieved by an O-ring 49 mounted in a groove in the outer surface of the piston 7.

An O-ring 50 is also interposed between the cheek 9 and the shaft 6.

In the embodiment shown in FIGS. 1 to 4, the links of the chains 24 and 24a interconnecting the pulleys of the variators 2 and 3 are made in a single piece, merely the elastically yieldable means 34 being mounted thereon.

Figure 5:
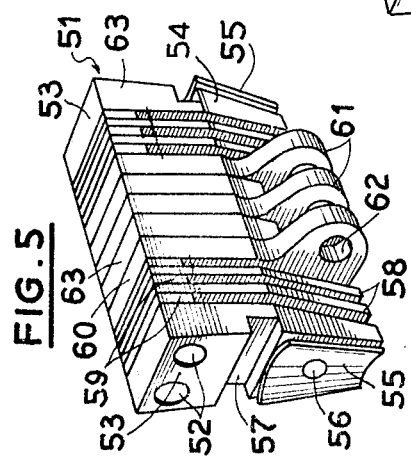
FIG. 5 is a perspective view of a chin link for a variator according to the invention comprising a plurality of assembled members.

The link 51 shown in FIG. 5 differs from the foregoing links in that it comprises a stack of plates or laminated elements held together by rods 52. Among these plates, there are two end plates 53 which are each provided with a projection 54 on which there is mounted an elastically yieldable means 55 which is curved and has its concavity facing outwardly and is maintained in position relative to the projection, with play, by a rivet 56.

It can be seen that, in the presently-described embodiment, the elastically yieldable means 55 is of different design to the means 34 of the link 25 shown in FIG. 4.

The plates 53 have in their intermediate part a groove 57 which impart thereto sufficient transverse elasticity to ensure the gripping of the disc 28 (FIG. 2) when the cheek of the corresponding pulley is shifted forward.

The link shown in FIG. 5 further comprises elastically yieldable plates 58 between which shims 59 forming recesses are interposed.

In its intermediate part, the link 51 comprises plates 60 provided with tabs 61 provided with apertures 62 for receiving the pivot pins of the links and plates 63 constituting shims interposed between the plates 60.

In the embodiment shown in FIG. 5, the link comprises heel portions having an inclination which corresponds to the conicity of the frustoconical surfaces of the cheeks with which the chain cooperates.

These heel portions are adapted to establish, for a given radial position of the chain relative to the pulley, a precise and reproducible transmission ratio.

However, in applications where this ratio can undergo small variations, the heel portions may be dispensed with.

An example of a chain having links which have no heel portions is shown in FIG. 2.

The absence of the heel portions permits, by a variation in the position of the cheeks which are movable in translation, varying the transmission ratio in an extremely rapid manner, which is not the case in conventional speed variators.

Figure 6:
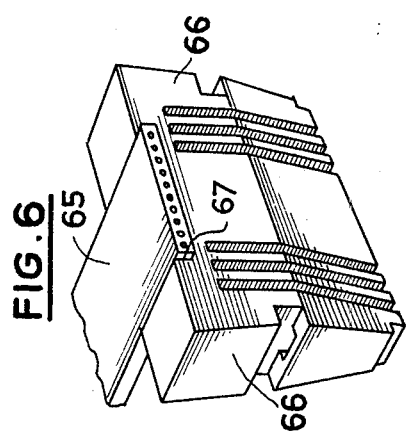
FIG. 6 is a perspective view of a belt element for a variator according to the invention.

FIG. 6 shows an element similar to that shown in FIG. 4 but fixed to a reinforced belt 65.

Moreover, this element is provided with heel portions 66 in the same way as the link shown in FIG. 5.

It comprises in its upper part a recess 67 in which the belt 65 is engaged.

Figure 7:
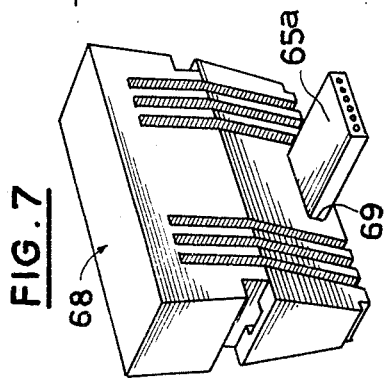
FIG. 7 is a perspective view of a modification of the element shown in FIG. 6.

In FIG. 7, there is shown a modification of the connecting means shown in FIG. 6.

The difference between the two embodiments resides in the fact that, in FIG. 7, the connecting belt 65a interconnecting the links 68 extends through the lower part of the link via a slot 69 formed in the latter.

FIGS. 8 and 9 shown partly a particular embodiment of a variator according to the invention.

In this embodiment, as in the foregoing embodiments, each pulley of a variator comprises a cheek 70 which is fixed axially and a cheek 71 which is movable in translation. Connecting means 72, here formed by a chain having links 73 similar to that shown in FIG. 5, interconnect the pulleys of the variator.

Mounted on each pulley shaft, such as shaft 74, is a sleeve 75 having outer teeth, and mounted on pins 76 (which are parallel to the shaft 74) to rotate thereon are comb-shaped members 77 having curved teeth 78. Each of the members 77 comprises a toothed sector 79 engaged with the teeth of the sleeve 75.

Consequently, the teeth 78 of the members 77 here perform the function of the discs 28 of the device shown in FIG. 2.

As can be seen in FIG. 9, a return spring 80, one end of which is rigid with the sleeve 75 whereas the other end is connected to the fixed cheek 70 of the pulley, acts permanently to maintain the members 77 in the deployed position in opposition to the action of the chain 72.

The profile of the curved teeth 78 is such that, irrespective of the position of the chain 72 relative to the pulleys, the zones of contact between the teeth 78 of the members 77 and the elastic plates 81 of the links 73 have roughly constant surfaces.

The inwardly folded position of the members 77 shown in dot-dash lines in FIG. 8 is reached when the cheeks 70 and 71 are spaced a maximum distance apart.

Figure 10:
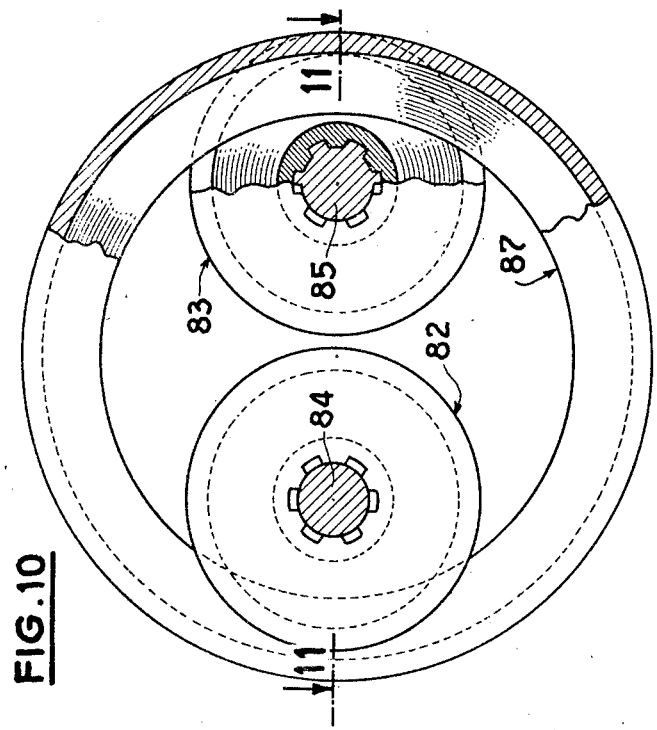
FIG. 10 is a diagrammatic view of a variator according to the invention the transmission means of which is a ring.
Figure 11:
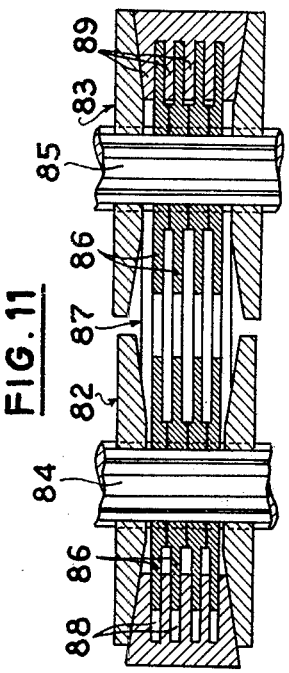
FIG. 11 is a sectional view taken on line 11—11 of FIG. 10.

The variator shown in FIGS. 10 and 11 is of the type having rigid connecting means.

It comprises, in the same way as the previously-described variators, two pulleys 82 and 83 having cheeks which are movable in translation in pairs and have frustoconical inner surfaces. Keyed to rotate with the shafts 84, 85 of the pulleys 82, 83 are discs 86 which cooperate with a rigid ring 87 having annular recesses 88 in which the discs 86 extend.

The recesses 88 are defined by ring elements 89 which are thin and elastically yieldable in the transverse direction so that the gripping force of the cheeks of a pulley results in the blocking of the discs 86 in the ring 87. The discs 86 are carried by the shaft 84. The gripping is achieved only on a radial line of the cheeks.

The springs provided in the embodiments comprising a chain and a belt are consequently unnecessary.

The various embodiments of variators just described have a certain number of advantages over known devices.

The fact that a plurality of discs keyed to the input and output shafts cooperate with a plurality of contact surfaces of the transmission means multiplies correspondingly the torque transmitting capacity.

Consequently, for a given force applied to the cheek which is movable in translation of a pulley of a variator, the torque transmitted by the variator according to the invention is much higher than that which can be transmitted by conventional variators.

This permits avoiding the application of high forces on the moving cheeks of the variators and consequently renders the use of any multiplying device having ramps unnecessary.

The possibility of transmitting high power enables the overall size of the variator according to the invention to be reduced.

The variator according to the invention permits the obtainment of transmission ratios which are reproducible with precision and it has a response time which may be reduced to very low values.

In the embodiment shown in FIG. 1, the transmission mechanism comprises two variators according to the invention coupled in series, but it will be understood that the variator 2 is also designed to be used alone. In this case, means are associated in the known manner with the moving cheek 23 of the second pulley 20 for biasing the moving cheek toward the fixed cheek 21 with a force compatible with the torque to be transmitted. These biasing means may be spring means or any other reaction device known in this art.

The variator according to the invention operates in a similar manner to conventional variators of this type.

Having now described my invention what I claim as new and desire to secure by Letters Patent is:

1. A transmission mechanism having a transmission ratio which is variable in a continuous manner, comprising at least one driving shaft and at least one driven shaft, a first pulley mounted on the driving shaft to rotate with the driving shaft and having a cheek which is fixed in translation and a cheek which is movable in translation relative to the fixed cheek, a second pulley mounted on the driven shaft to rotate with the driven shaft and having a cheek fixed in translation and a cheek which is movable in translation relative to the fixed cheek of the second pulley, means associated with the displacement of the movable cheek of the first pulley, means for biasing the movable cheek toward the fixed cheek of the second pulley, and transmission means extending around the first pulley and second pulley, radially extending elements mounted on the driving shaft and the driven shaft for rotation with the driving shaft and the driven shaft and located between the fixed cheek and the movable cheek of the first pulley and the fixed cheek and the movable cheek of the second pulley said radially extending elements being axially movable on said driving and driven shaft as the distance between the cheeks varies, said transmission means having portions which define recesses in the transmission means, the radially extending elements being capable of engaging in corresponding recesses of said recesses in operation of the mechanism, said portions of the transmission means having an elasticity transversely of the transmission means whereby to ensure the gripping of said radially extending elements upon the application of a force for moving the cheeks of said first and second pulleys toward each other.

2. A mechanism as claimed in claim 1, wherein said transmission means comprise a chain having links and each link of the chain comprises elastically yieldable plates which constitute said portions of the transmission means which have a transverse elasticity and define said recesses parallel to the direction of displacement of the chain.

3. A mechanism as claimed in claim 2, wherein each chain link is in one piece.

4. A mechanism as claimed in claim 2, wherein each chain link comprises a stack of plates and pins extending transversely of the link and chain and holding said stack of plates assembled.

5. A mechanism as claimed in claim 4, wherein each of said stacks comprises end plates, elastically yieldable plates inserted between the end plates, shims interposed between the elastically yieldable plates and defining said recesses, plates provided with tab portions defining apertures, articulation pins extending through the apertures and connecting the link to the adjacent link, and plates forming shims interposed between said plates provided with tab portions.

6. A mechanism as claimed in claim 1, wherein said transmission means comprise a belt, belt elements carried by the belt and comprising portions having an elasticity transversely of the belt element and belt and defining said recesses.

7. A mechanism as claimed in claim 6, wherein each of said belt elements is fixed to said belt by an upper part of the belt element.

8. A mechanism as claimed in claim 6, wherein each of said belt elements is fixed to said belt by a lower part of the belt element, a slot being defined by each of said belt elements, through which slot said belt extends.

9. A mechanism as claimed in any one of the claims 2 to 5, comprising a frustoconical surface on each cheek, contact means at the ends of each chain link for cooperation and contact with the frustoconical surfaces of the cheeks of the pulleys, each contact means comprising a projecting portion rigid with each of the outer plates of the considered link, a curved elastically yieldable means carried by the projecting portion for achieving the gripping of the radially extending elements by said elastically yieldable plates of the links when the links reach a radial position relative to the frustoconical surfaces of the cheeks of the pulleys.

10. A mechanism as claimed in claim 9, wherein said elastically yieldable means is outwardly convex and includes hook portions engaged in recesses formed in the projecting portions.

11. A mechanism as claimed in claim 9, wherein said elastically yieldable means has an outwardly facing concavity and a rivet fixes the elastically yieldable means to said projecting portion.

12. A mechanism as claimed in claim 9, wherein each link comprises at least one heel portion disposed above a contact means.

13. A mechanism as claimed in any one of claims 1, 6, 7 or 8, comprising a frustoconical surface on each cheek, contact means at the ends of each belt element for cooperation and contact with the frustoconical surfaces of the cheeks of the pulleys, each contact means comprising a projecting portion rigid with each outer end of the considered belt element, a curved elastically yieldable means carried by the projecting portion for achieving the gripping of the radially extending elements by said elastically yieldable plates of the belt element when the belt elements reach a radial position relative to the frustoconical surfaces of the cheeks of the pulleys.

14. A mechanism as claimed in claim 13, wherein said elastically yieldable means is outwardly convex and includes hook portions engaged in recesses formed in the projecting portions.

15. A mechanism as claimed in claim 13, wherein said elastically yieldable means has an outwardly facing concavity and a rivet fixes the elastically yieldable means to said projecting portion.

16. A mechanism as claimed in any one of the claims 1 and 6, 7 or 8, wherein each belt element comprises at least one heel portion disposed above a contact means.

17. A mechanism as claimed in claim 1, 2 or 6, wherein said radially extending elements comprise planar discs.

18. A mechanism as claimed in claim 1, 2 or 6, wherein said radially extending elements comprise biconvex discs.

19. A mechanism as claimed in claim 17, comprising a hub which carries the discs and is keyed to rotate with the corresponding shaft.

20. A mechanism as claimed in claim 18, comprising a hub which carries the discs and is keyed to rotate with the corresponding shaft.

21. A mechanism as claimed in claim 1, 2 or 6, wherein said radially extending elements are in the shape of a comb having curved comb teeth, the mechanism further comprising pins which are parallel to the shaft of the considered pulley and are evenly spaced apart around said shaft, the comb-shaped elements being rotatably mounted on the pins and means for deploying said comb-shaped elements.

22. A mechanism as claimed in claim 21, wherein said deploying means comprise a sleeve having outer teeth and mounted to rotate on the shaft of the considered pulley, toothed sectors associated with each comb-shaped element, and a return spring cooperative with the sleeve for biasing the sleeve in a direction for deploying said comb-shaped elements.

23. A mechanism as claimed in claim 1, wherein said transmission means comprise a rigid ring and said recesses are annular and said radially extending elements extend into said annular recesses.

* * * * *